United States Patent Office 3,367,913

Patented Feb. 6, 1968

3,367,913

THERMOSETTING EPOXY RESIN COMPOSITION CONTAINING A ZINC CHELATE

Benjamin J. Intorre, Dumont, and Alfred S. Kidwell, Mountain Lakes, N.J., assignors to Interchemical Corporation, New York, N.Y., a corporation of Ohio No Drawing. Filed Sept. 9, 1966, Ser. No. 578,120
6 Claims. (Cl. 260—47)

This invention relates to epoxy resin compositions which are normally stable at ambient temperatures, and which may be cured to thermoset compositions through the application of heat.

Conventionally, epoxy resins are so reactive with standard catalysts or closslinking agents that the resins in the presence of such catalysts or crosslinking agents tend to undergo considerable crosslinking even on standing at room temperature. Consequently, most standard compositions of epoxy resins and catalysts or crosslinking agents are regarded as unstable and cannot be marketed as "one-package" systems. This has led to the general practice of using a "two-package" system in which it is necessary to mix the catalyst and cross-linking agent with the polymer pust prior to use. The disadvantages of such a procedure are abvious. Among them are the need to store and keep inventories of two separate items and more important the requirement that the ultimate user also be a formulator. Consequently, results often have to depend on the user's skill as a formulator.

We have now discovered a normally stable but thermosetting composition containing an epoxy resin and a catalyst or crosslinking agent comprising a zinc chelate formed by the reaction of o-amino phenol and a zinc salt. The zinc salt may be any conventional zinc salt such as zinc acetate, zinc chloride, zinc nitrate or zinc sulfate. The chelate is preferably formed by heating the zinc salt and the o-amino phenol at reflux temperatures. Preferably, from one to two moles of the o-amino phenol are reacted for each mole of the zinc salt. The epoxy resins may be any conventional thermosetting epoxy resin, particularly those produced by the reaction of a polyhydric phenol such as 2,2-diphenol propane with epichlorohydrin. These resins may be produced in accordance with the procedure of U.S. Patent No. 2,633,458. By regulating the proportions of the two reactants, the molecular size and molecular structure of the polyepoxide resins may be controlled. Other epoxy resins may be used such as glycidyl ethers of glycerine. When the zinc chelate is used as a catalyst for epoxy resins as described above, from 5 to 50 parts of chelate are used for each part of epoxy resin.

In accordance with a further aspect of the present invention, the zinc chelates of this invention may also be used in a "one-package" system as promoters in combination with dicyandiamide catalyst for epoxy resins. When used as such promoters, the chelates appear to increase the rate of cure of the epoxy resin and dicyandiamide compositions. When used as promoters, preferably from 1 to 20 parts of the chelate and from 5 to 15 parts of the dicyandiamide are used for each part of epoxy resin.

Unless otherwise indicated, all proportions set forth in the present specification and claims are by weight.

*Example 1*

A zinc chelate is formed by reacting 60 grams of zinc acetate and 60 grams of o-amino phenol dissolved in 750 ml. of methanol. The mixture is heated at reflux at 66° C. for ½ hour. Then the solvent is removed.

*Example 2*

As an alternative to Example 1, 1 mole of zinc chloride may be reacted with 2 moles of o-amino phenol dissolved in 2000 g. of water, the solution being substantially neutralized through the addition of ammonium hydroxide. Following the procedure of Example 1, the reaction mixture is refluxed until the reaction is complete, and the reaction product is separated from water by filtration.

Example 2 may be repeated using the same procedure, ingredients, proportions and conditions except that either zinc nitrate or zinc sulfate is used in place of zinc chloride.

*Example 3*

The following ingredients are milled on a three-roll mill until a fluid paste is formed:

| | Parts by weight, g. |
|---|---|
| Epon 828 [1] | 25.0 |
| Calcium carbonate filler | 7.5 |
| Stabilizer (fumed colloidal silica) | 0.25 |
| Zinc chelate of Example 1 | 5.0 |

[1] Epon 828 is an epoxy resin formed by the reaction of 2,2-diphenol propane and epichlorohydrin having an average molecular weight of about 360 and an epoxide equivalent weight of 190.

The resulting composition is applied at a thickness of 10 mils to an aluminum sheet to which there is applied a second aluminum sheet in a ½ inch wide overlapping seam. The seam is cured at 300° F. for 10 minutes.

The composition cures to give very good adhesion between the sheets of aluminum at the seam.

At room temperature, the composition is quite stable and may be stored for days and weeks without any appreciable deterioration.

Example 3 may be repeated using the same ingredients, proportions, conditions and procedure except that the zinc chelates of Example 2 are used instead of those of Example 1.

*Example 4*

The following ingredients are milled, on a three-roll mill until a fluid paste is formed:

| | Parts by weight, g. |
|---|---|
| Epon 828 | 25 |
| Calcium carbonate filler | 7.5 |
| Stabilizer (fumed colloidal silica) | 0.25 |
| Zinc chelate of Example 1 | 2.5 |
| Dicyandiamide | 2.5 |

Then following the procedure of Example 3, the composition is used to join two sheets of aluminum by a seam.

The bond is even better than that of Example 3.

Example 4 may be also repeated using the chelate of Example 2 in place of those of Example 1 with about the same results.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A thermosetting composition comprising an epoxy resin having a plurality of 1,2-epoxide groups and a zinc chelate formed by the reaction of o-amino phenol and a zinc salt.

2. The composition of claim 1 wherein said zinc salt is zinc acetate.

3. The composition of claim 1 wherein said epoxy resin is the reaction product of 2,2-diphenol propane and epichlorohydrin.

4. The composition of claim 1 further including dicyandiamide.

5. The composition of claim 4 wherein said zinc salt is zinc acetate.

6. The composition of claim 5 wherein said epoxy resin is the reaction product of 2,2-diphenol propane and epichlorohydrin.

No references cited.

WILLIAM H. SHORT, *Primary Examiner.*

T. D. KERWIN, *Assistant Examiner.*